(12) United States Patent
Yamamura

(10) Patent No.: US 6,604,860 B2
(45) Date of Patent: Aug. 12, 2003

(54) THRUST BEARING DEVICE AND MOTOR

(75) Inventor: Kengo Yamamura, Shizuoka-ken (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/922,238

(22) Filed: Aug. 3, 2001

(65) Prior Publication Data

US 2002/0067876 A1 Jun. 6, 2002

(30) Foreign Application Priority Data

Aug. 3, 2000 (JP) .................................... 2000-235696
Jul. 25, 2001 (JP) .................................... 2001-224990

(51) Int. Cl.[7] ............................................ F16C 27/04
(52) U.S. Cl. ..................................... 384/611; 384/245
(58) Field of Search ................................ 384/610, 611, 384/245, 244, 246

(56) References Cited

U.S. PATENT DOCUMENTS

| | | | | |
|---|---|---|---|---|
| 4,265,498 A | * | 5/1981 | Luce et al. ................... | 384/606 |
| 4,618,273 A | * | 10/1986 | Gotz et al. ................... | 384/606 |
| 5,090,261 A | * | 2/1992 | Nakatsukasa ................ | 384/610 |
| 5,212,999 A | * | 5/1993 | Kitada ......................... | 384/223 |
| 5,213,000 A | * | 5/1993 | Saya et al. ................... | 264/262 |
| 5,486,054 A | * | 1/1996 | Nagata et al. ................ | 384/420 |
| 5,555,124 A | * | 9/1996 | Yoshitsugu et al. .......... | 359/198 |
| 5,886,438 A | * | 3/1999 | Kawanishi .................... | 310/194 |
| 5,927,869 A | * | 7/1999 | Zott .............................. | 384/610 |
| 6,190,053 B1 | * | 2/2001 | Stahlecker et al. .......... | 384/610 |

FOREIGN PATENT DOCUMENTS

| | | |
|---|---|---|
| JP | 58-197711 | 12/1983 |
| JP | 60-103743 | 7/1985 |
| JP | 03217655 | 8/1991 |
| JP | 5-15103 | 1/1993 |

* cited by examiner

Primary Examiner—Christopher P. Schwartz
Assistant Examiner—Devon Kramer
(74) Attorney, Agent, or Firm—Sheridan Ross PC

(57) ABSTRACT

A metallic receiving plate is located in a holding recess of a housing such that the plate opposes the distal end face of a worm shaft. The distal end of the receiving plate with respect to the rotating shaft defines a charging cavity in the holding recess. A resin material is charged into the charging cavity. A metallic ball is located between the distal end face of the worm shaft and the receiving plate. The ball makes point contact with the distal end face of the worm shaft and with the receiving plate. Two protrusions are formed on the receiving plate. The protrusions are embedded in the resin material to connect the receiving plate to the solidified resin material and to prevent the receiving plate from rotating. Thus, the rotational resistance of the worm shaft is reduced, and the durability of the bearing device is improved.

21 Claims, 3 Drawing Sheets

US 6,604,860 B2

THRUST BEARING DEVICE AND MOTOR

BACKGROUND OF THE INVENTION

The present invention relates to a thrust bearing device and a motor equipped with the bearing device.

Japanese Unexamined Patent Publication No. Hei 5-15103 discloses an example of a thrust bearing device. In the bearing device disclosed in this publication, a rotating shaft or an output shaft of a motor is received at one end by a holder located in a gear case. A sleeve for receiving the radial force of the output shaft and a steel ball for receiving the axial force of the output shaft are arranged in the holder. The holder has a plurality of supporting legs extending toward the inner bottom face of the gear case. A cavity is present between the inner bottom face of the gear case and the holder. The gear case has a charging port communicating with the cavity.

Filler material is charged through the charging port into the cavity. The filler solidifies to position the output shaft in the axial direction and prevent backlash in the axial direction. Further, the supporting legs of the holder are embedded in the filler, and thus the holder is supported on the gear case and cannot rotate relative to the gear case. Therefore, the holder is not caused to rotate together with the output shaft.

The steel ball is held and enveloped by the holder. The steel ball and the holder contact one another over a large contact surface area. This increases the sliding resistance between the steel ball and the holder and the rotational resistance of the output shaft.

Although not specified in the publication, the holder is likely to be made of resin, because it has a relatively intricate configuration. However, a resin holder has poor durability, since it can be deformed by the frictional heat generated between the holder and the steel ball or by the axial force of the output shaft.

BRIEF SUMMARY OF THE INVENTION

It is an object of the present invention to provide a thrust bearing device that is durable and that reduces the rotational resistance of a rotating shaft and a motor equipped with the bearing device.

To attain the above object, the present invention provides a thrust bearing device for a rotating shaft. The device has a housing containing a holding recess. A receiving plate is located in the holding recess to oppose an end face of the rotating shaft. The receiving plate defines, at a distal end thereof with respect to the rotating shaft, a charging cavity in the holding recess. A metallic ball is located in the holding recess between the end face of the rotating shaft and the receiving plate. The ball contacts the end face of the rotating shaft and the receiving plate. A resin material is charged into the charging cavity. Afterwards, the resin material solidifies to restrict the axial position of the rotating shaft. The receiving plate is made of a metal and makes point contact with the ball. The receiving plate is formed so that it does not rotate with respect to the solidified resin.

The present invention also provides a motor having a motor main body with a drive shaft and a decelerating mechanism for decelerating rotation of the drive shaft. The decelerating mechanism includes a housing, a worm shaft, which is located in the housing so that the worm shaft is connected to the drive shaft, and a thrust bearing device, which is located near a distal end of the worm shaft. The thrust bearing device contains a holding recess defined in the housing and a metallic receiving plate located in the holding recess to oppose a distal end face of the worm shaft. The receiving plate defines, at a distal end thereof with respect to the worm shaft, a charging cavity in the holding recess. A metallic ball is located in the holding recess between the distal end face of the worm shaft and the receiving plate. The ball contacts the distal end face of the worm shaft and the receiving plate. A resin material is charged into the charging cavity. Afterwards, the resin material solidifies to restrict the axial position of the worm shaft. The thrust bearing device also has connecting means for connecting the receiving plate to the solidified resin material and for preventing rotation of the receiving plate.

BRIEF DESCRIPTION OF THE DRAWING

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention, which is realized in a motor 1 for a power window device attached to a vehicular door, will be described below referring to FIGS. 1, 1A and 2.

Figure 1:
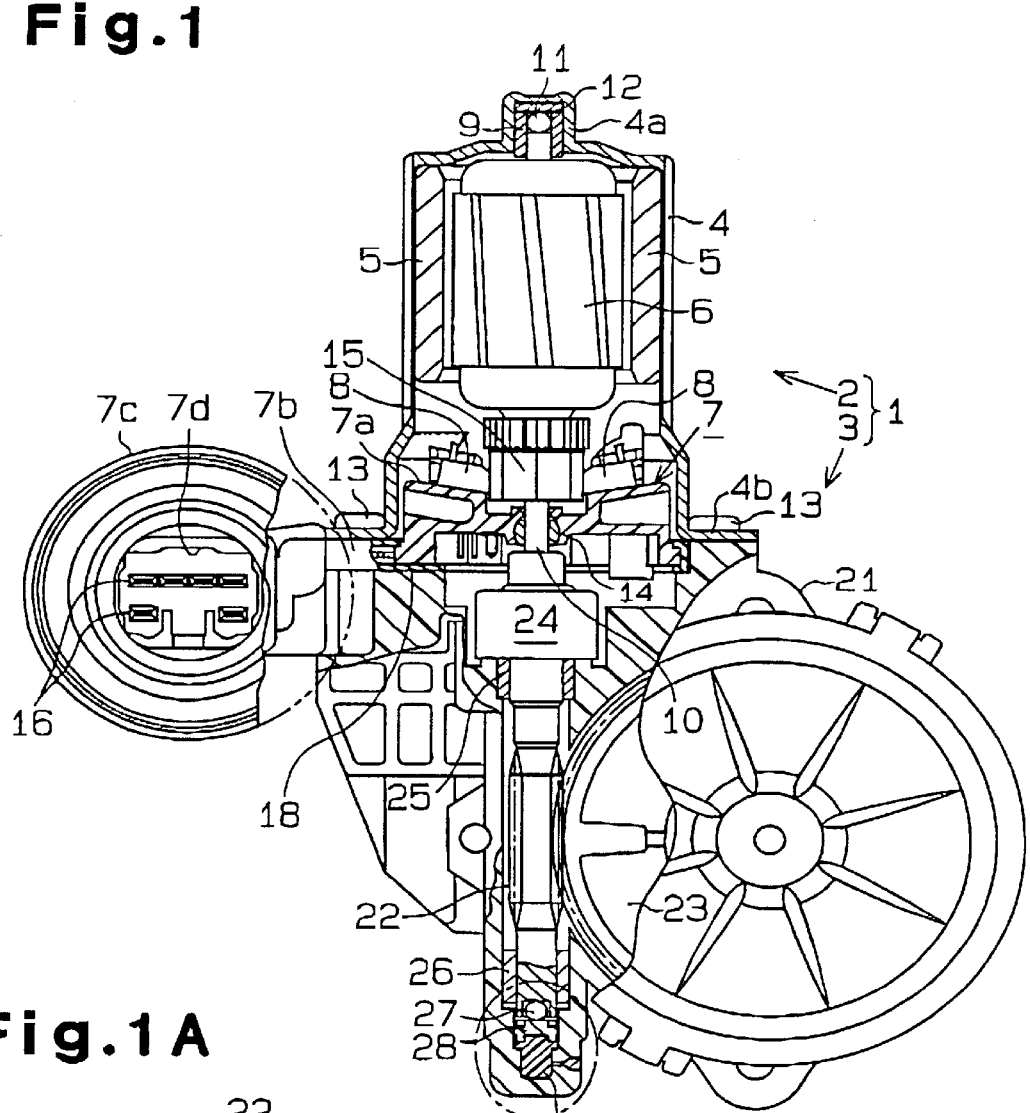
FIG. 1 is a cross-sectional view of a motor according to a first embodiment of the present invention.

As shown in FIG. 1, the motor 1 is provided with a motor main body 2 and a speed reducer 3. The motor main body 2 has a yoke housing 4, a pair of magnet pieces 5, an armature 6, a brush holder 7 and a pair of brushes 8.

The yoke housing 4 has a cylindrical shape with a closed bottom, and the magnet pieces 5 are fixed to the inner side thereof. A depression 4a is formed on the bottom of the yoke housing 4 at the center thereof, in which a bearing 9 is fixed. The bearing 9 rotatably supports the proximal end of a drive shaft 10 of the armature 6. The depression 4a contains a ball 11 and a receiving plate 12, which bear axial loads of the drive shaft 10.

The yoke housing 4 has a flange 4b formed around the opening thereof. A resin gear housing 21 of the decelerating mechanism 3 is fastened against the flange 4b with screws 13. The brush holder 7 is clamped between the flange 4b and the gear housing 21.

The brush holder 7 has a resin holder body 7a, an arm 7b and a power feeding section 7c, which are molded integrally therewith. The holder body 7a has a bearing 14 fixed at the center, and the bearing 14 rotatably supports the distal end of the drive shaft 10. The holder 7a also supports the brushes 8, which contact a commutator 15, which is fixed to the drive shaft 10.

The arm 7b protrudes from the holder body 7a outward through the yoke housing 4 and the gear housing 21. A power feeding section 7c is located at the distal end of the arm 7b and includes a connecting recess 7d for admitting a connector (not shown) of a vehicle. A plurality of terminals 16 are exposed in the connecting recess 7d. The terminals 16 are electrically connected to the brushes 8 and various kinds of sensors (not shown) attached to the motor 1, including a rotation sensor.

The arm 7b and the power feeding section 7c are covered with a sealing member 18 made of a rubber, an elastomer, a viscous resin or the like. The sealing member 18 prevents water from entering the motor 1.

The decelerating mechanism 3 contains a worm shaft 22, a worm wheel 23 and a clutch 24, which are housed in the gear housing 21. The worm shaft 22 is rotatably supported at each end by a pair of radial bearings 25 and 26 located in the gear housing 21. The worm shaft 22 is connected at its proximal end to the drive shaft 10, which extends from the motor main body 2 into the gear housing 21, by the clutch 24. While the clutch 24 transmits the driving force of the drive shaft 10 to the worm shaft 22, it inhibits transmission of driving force from the worm shaft 22 to the drive shaft 10. When a rotating force other than the driving force of the drive shaft 10 is applied to the worm shaft 22, the clutch 24 prevents the worm shaft 22 from rotating.

Figure 1A:
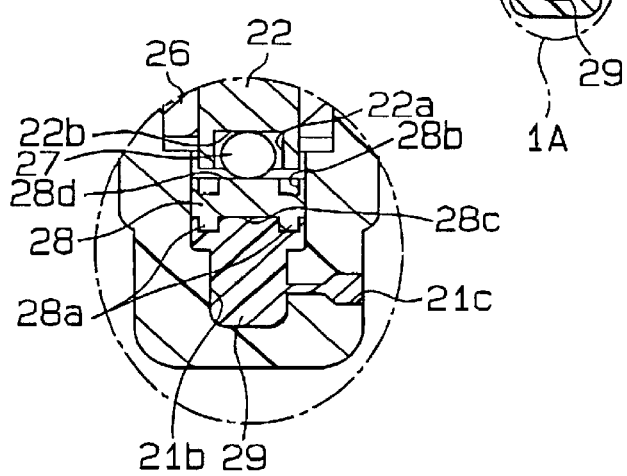
FIG. 1A is an enlarged view of the portion 1A shown in FIG. 1.

As shown in FIG. 1A, the worm shaft 22 has at around the distal end a thrust bearing device. More specifically, the gear housing 21 contains a cylindrical holding recess 21b defined to oppose the distal end of the worm shaft 22. The holding recess 21b contains a metallic ball 27 and a metallic receiving plate 28, which bear axial loads from the worm shaft 22.

The worm shaft 22 has, at its distal end face, a receiving recess 22a for admitting the ball 27. The receiving recess 22a has an inside diameter slightly larger than the diameter of the ball 27. The receiving recess 22a has a bottom face 22b, which is planar and which orthogonally intersects the axis of the worm shaft 22. The bottom face 22b makes point contact with the ball 27. The receiving recess 22a serves also as a grease well.

The holding recess 21b has a large-diameter portion and a small-diameter portion, which is located at a position deeper than the large-diameter portion. As shown in FIGS. 1A and 2, the receiving plate 28 is substantially disc-shaped and has a diameter substantially the same as that of the large-diameter portion of the holding recess 21b. The receiving plate 28 has on one side a receiving face 28d, which faces the ball 27, and on the other side a fitting face 28c. A pair of columnar protrusions 28a are formed on the fitting face 28c and extend in the axial direction of the receiving plate 28. The two protrusions 28a are arranged radially equidistant from the axis of the receiving plate 28 and are located 180° apart from each other. In other words, the protrusions 28a are located at positions offset radially from the axis of the receiving plate 28. A pair of columnar recesses 28b are defined on the receiving face 28d in alignment with the protrusions 28a, respectively.

The receiving plate 28 is formed by pressing. The recesses 28b and the protrusions 28a are formed simultaneously by pressing the portions of the receiving face 28d corresponding to the locations of the recesses 28b with tools of a pressing machine. In other words, the portions of the receiving plate 28 that are pressed to define the recess 28b form the protrusions 28a.

The receiving face 28d is planar and orthogonal to the axis of the worm shaft 22 and makes point contact with the ball 27. As described above, the inside diameter of the receiving recess 22a of the worm shaft 22 is slightly larger than the diameter of the ball 27, and the ball 27 can move within the receiving recess 22a. Therefore, the point of contact between the bottom face 22b of the receiving recess 22a and the ball 27, and the point of contact between the receiving face 28d and the ball 27 change. This prevents biased abrasion of the two faces 22b and 28d.

The gear housing 21 has a communicating hole 21c communicating the holding recess 21b with the outside. After the worm shaft 22, the ball 27 and the receiving plate 28 are incorporated into the gear housing 21, a fluid resin material 29 is charged through the communicating hole 21c into a cavity defined by the holding recess 21b and the receiving plate 28. The resin material 29 solidifies, which positions of the worm shaft 22 in the axial direction and prevents of axial backlash of the worm shaft 22.

The solidified resin material 29 adheres to the inner surface of the holding recess 21b and is immobilized against the gear housing 21. The protrusions 28a on the receiving plate 28 are embedded in the solidified resin material 29. Thus, the receiving plate 28 is immobilized with respect to the resin material 29 and the gear housing 21. Therefore, the receiving plate 28 cannot be rotated by the worm shaft 22, which reduces rotational resistance of the worm shaft 22.

The worm shaft 22 meshes with the worm wheel 23. The worm wheel 23 is connected to an output shaft (not shown) which is orthogonal to the worm shaft 22. Although not illustrated, the output shaft is connected to a known X arm regulator for driving vehicular window glass.

When the motor main body 2 is started, the rotation of the drive shaft 10 is transmitted through the clutch 24 to the worm shaft 22. When the worm shaft 22 rotates, the output shaft is rotated by the worm wheel 23 to cause the X arm regulator to slide the vehicular window glass.

This embodiment has the following advantages.

The worm shaft 22 makes point contact with the ball 27, which makes point contact with the receiving plate 28. More specifically, the ball 27 makes point contact with the worm shaft 22 and with the receiving plate 28 on a line parallel to the axis of the worm shaft 22. Thus, there is little sliding resistance between the ball 27 and the worm shaft 22 and between the ball 27 and the receiving plate 28. In addition, the receiving plate 28 cannot be rotated by the worm shaft 22, and the rotational resistance of the worm shaft 22 is thus minimized. The metallic receiving plate 28 is very durable, since it is not deformed by frictional heat generated between the plate 28 and the ball 27 or by the axial force of the worm shaft 22. As a result, an efficient and durable motor 1 results.

The wall of the holding recess 21b forms a circle, in a cross-sectional plane. The receiving plate 28 is disc-shaped to conform to the wall of the holding recess 21b. Therefore, the receiving plate 28 and the holding recess 21b can be machined very accurately and easily such that there is no gap between the peripheral face of the receiving plate 28 and the wall of the holding recess 21b and such that the receiving plate 28 can slide smoothly in the axial direction within the holding recess 21b. Thus, when the resin material 29 is charged into the holding recess 21b, there is no leakage of the resin material 29 between the peripheral face of the receiving plate 28 and the wall of the holding recess 21b to the cavity on the other side of the receiving plate 28, in which the ball 27 is located. Also, when the resin material 29 is charged into the holding recess 21b, the receiving plate 28 slides smoothly to a position in which it is in contact with the ball 27, which permits sufficient charging of the resin material 29. As a result, the receiving plate 28 is positioned accurately.

The receiving plate 28 is formed by pressing. The recesses 28b and the protrusions 28a are formed simultaneously by pressing portions of the receiving face 28d corresponding to locations of the recesses 28b with tools of a pressing machine. In other words, the portions of the receiving plate 28 that were pressed to define the recess 28b form the protrusions 28a. This is useful for preventing deformation of the receiving plate 28 during the pressing. The recesses 28b also serve as grease wells, so that the receiving plate 28 and the worm shaft 22 retain grease between them or around the ball 27, which improves lubrication.

The bottom face 22b of the receiving recess 22a and the receiving face 28d of the receiving plate 28, which contact the ball 27, are planar and orthogonal to the axis of the worm shaft 22. Further, the receiving recess 22a has an inside diameter slightly larger than the diameter of the ball 27. Thus, the ball 27 can move within the receiving recess 22a in a direction that is orthogonal to the axis of the worm shaft 22. Therefore, the point of contact between the bottom face 22b of the receiving recess 22a and the ball 27 and the point of contact between the ball 27 and the receiving face 28d change during rotation of the worm shaft 22. This prevents biased abrasion of the two faces 22b and 28d and maintains smooth rotation of the worm shaft 22 over an extended period.

Figure 2:
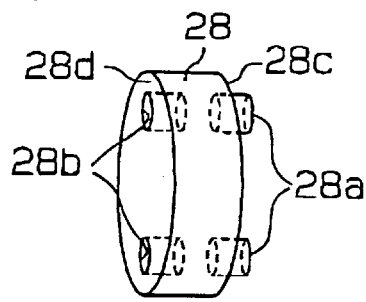
FIG. 2 is a perspective view of the receiving plate shown in FIG. 1.

The receiving plate 28 is not limited to that shown in FIG. 2 and can be modified, for example, as shown in FIGS. 3(a) to 3(e).

Figure 3A:
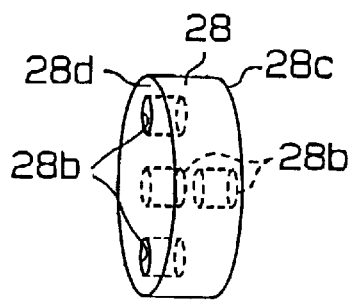
FIG. 3(a) is a perspective view of a receiving plate according to a second embodiment of the present invention.

The receiving plate 28 of a second embodiment shown in FIG. 3(a) has a pair of recesses 28b on the receiving face 28d, like the receiving plate 28 in FIG. 2. However, the receiving plate 28 also has another pair of recesses 28b on the fitting face 28c instead of the protrusions 28a in FIG. 2. The recesses 28b on the fitting face 28c are angularly spaced by 90° with respect to the recesses 28b on the receiving face 28d.

When resin material 29 is charged into the holding recess 21b of the gear housing 21, the resin material 29 flows into the recesses 28b on the fitting face 28c. Thus, the receiving plate 28 does not rotate with respect to the solidified resin material 29. Since the fitting face 28c and the receiving face 28d have the same configuration, there is no need for concern about orientation of the receiving plate 28 with respect to the gear housing 21. The recesses 28b on the fitting face 28c are angularly spaced from those on the receiving face 28d. This minimizes deformation of the receiving plate 28 at the time of pressing.

Figure 3B:
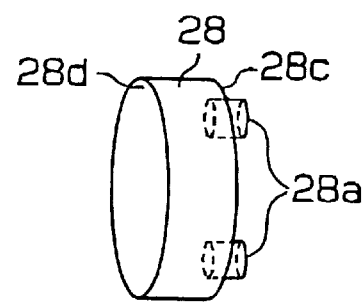
FIG. 3(b) is a perspective view of a receiving plate according to a third embodiment of the present invention.

The receiving plate 28 of a third embodiment shown in FIG. 3(b) is like the receiving plate 28 of FIG. 2, except that the recesses 28b are omitted. In other words, while a pair of protrusions 28a are formed on the fitting face 28c of the receiving plate 28, the receiving face 28d is planar and orthogonal to the axis of the worm shaft 22.

Figure 3C:
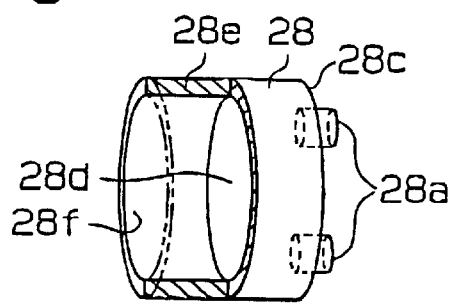
FIG. 3(c) is a partly cutaway perspective view of a receiving plate according to a fourth embodiment of the present invention.

The receiving plate 28 of a fourth embodiment shown in FIG. 3(c) is like the receiving plate 28 of FIG. 3(b), except that a cylindrical body 28e is added. In other words, the cylindrical body 28e is formed integrally with the receiving plate 28 and extends axially from the receiving face 28d. The cylindrical body 28e has a diameter equal to that of the receiving plate 28. The cylindrical body 28e defines a receiving recess 28f for admitting the ball 27. The receiving recess 28f serves also as a grease well. Since the receiving plate 28 has the receiving recess 28f, the distal end face of the worm shaft 22 may be planar and orthogonal to the axis of the worm shaft 22.

Figure 3D:
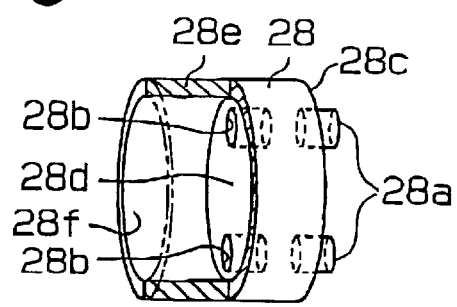
FIG. 3(d) is a partly cutaway perspective view of a receiving plate according to a fifth embodiment of the present invention.

The receiving plate 28 of a fifth embodiment shown in FIG. 3(d) is like the receiving plate of FIG. 2, except that the cylindrical body 28e shown in FIG. 3(c) is added.

Figure 3E:
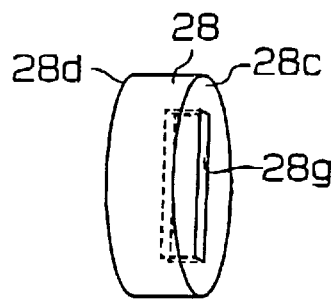
FIG. 3(e) is a perspective view of a receiving plate according to a sixth embodiment of the present invention.

In the receiving plate 28 of a sixth embodiment shown in FIG. 3(e), the receiving face 28d of the receiving plate 28 is planar and orthogonal to the axis of the worm shaft 22. No protrusion 28a is present on the fitting face 28c, and an elongated recess 28g is formed instead. The elongated recess 28g extends, for example, diametrically on the fitting face 28c. When the resin material 29 is charged into the holding recess 21b of the gear housing 21, the resin material 29 flows into the elongated recess 28g on the fitting face 28c. Therefore, the receiving plate 28 does not rotate with respect to the solidified resin material 29.

As described above, the shape of the receiving plate of the present invention is not critical so long as it is made of a metal and makes point contact with the ball and cannot rotate with respect to the resin material 29.

Figure 4A:
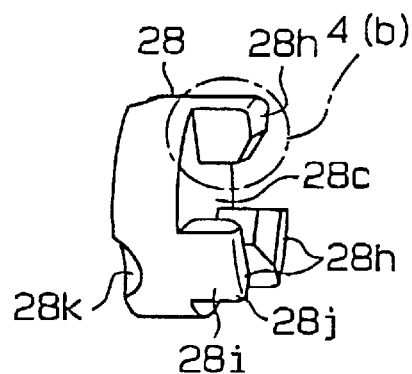
FIG. 4(a) is a perspective view of a receiving plate according to a seventh embodiment of the present invention.
Figure 4B:
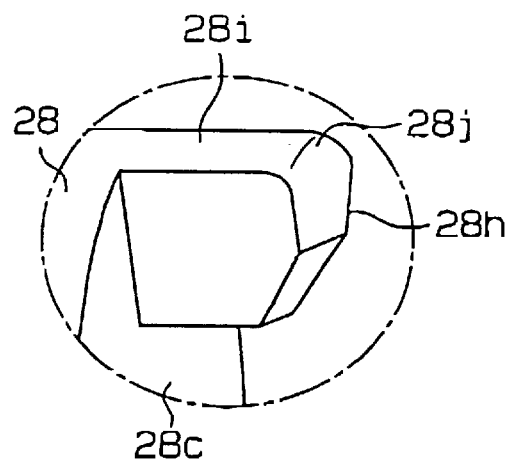
FIG. 4(b) is an enlarged view of the portion 4(b) shown in FIG. 4(a)
Figure 4C:
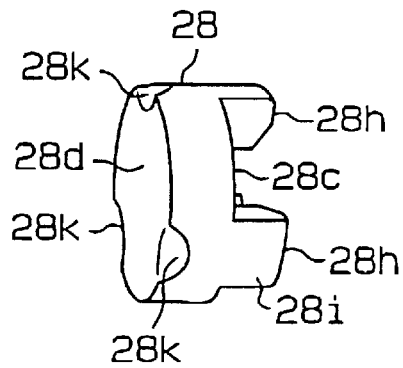
FIG. 4(c) is another perspective view of the receiving plate shown in FIG. 4(a) viewed from a different angle.

It is also possible to employ a receiving plate 28 of a seventh embodiment as shown in FIGS. 4(a) to 4(c). This receiving plate 28 has three protrusions 28h on the fitting face 28c. These protrusions 28h are radially equidistant from the axis of the receiving plate 28 and are located at equi-angular intervals. Each protrusion 28h has substantially rectangular cross section and also has a curved outer face 28i extending to the peripheral face of the receiving plate 28. Each protrusion 28h has a chamfer 28j at the tip. The chamfer 28j may be curved or planar.

The receiving face 28d is planar and orthogonal to the axis of the worm shaft 22. Three notches 28k are formed at the same angles as the protrusions 28h. Each notch 28k is formed to extend from the receiving face 28d to the peripheral face of the receiving plate 28.

The protrusions 28h function like the protrusions 28a of the receiving plate 28 in FIG. 2. The three protrusions 28h are formed at radially outermost positions of the receiving plate and extend straight from the peripheral face of the receiving plate 28. Therefore, if torque from the worm shaft 22 acts upon the receiving plate 28 through the ball 27, the force applied to each protrusion 28h is rather moderated. This enables the size of each protrusion 28h to be reduced. It is also possible to form a recess or recesses on the fitting face 28c in place of the protrusions 28h.

The chamfer 28j formed on each protrusion 28h facilitates insertion of the receiving plate 28 into the holding recess 21b of the gear housing 21. The outer face 28i of each protrusion 28h contacts the wall of the holding recess 21b together with the peripheral face of the receiving plate 28. Therefore, the receiving plate 28 can be fitted in the holding recess 21b without tilting 21b and is stable. Since the receiving plate 28 is stable and is contained in the holding recess 21b, the axial thickness of the receiving plate can be reduced.

The notches 28k are formed along the edge of the receiving plate 28 at the angular positions of the protrusions 28h.

The notches 28k prevent distortion of the receiving plate 28 in forming the plate 28. The notches 28k serve also as grease wells.

The present invention may be modified as follows:

The receiving plate 28 may be formed by methods other than pressing, such as, forging and cutting.

The constitution of the motor main body 2 and that of the decelerating mechanism 3 may suitably be modified. For example, the clutch 24 located between the drive shaft 10 and the worm shaft 24 may be omitted to connect the drive shaft 10 directly with the worm shaft 22. In this case, the drive shaft 10 may be formed integrally with the worm shaft 22.

The present invention may be applied not only to motors for power window devices but also to other in-vehicle motors or motors for other purposes. The present invention may also be applied to a thrust bearing device in driving units other than motors.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A thrust bearing device for a rotating shaft, the device comprising:
    a housing in which a holding recess is formed;
    a receiving plate formed from metal located in the holding recess to face an end of the rotating shaft, wherein the receiving plate defines a resin cavity in the holding recess;
    a metallic ball located in the holding recess between the end of the rotating shaft and the receiving plate, wherein the ball is located between the end face of the rotating shaft and the receiving plate and makes point contact with the receiving plate; and
    a resin material that fills the resin cavity, wherein the resin material restricts axial movement of the rotating shaft, and the resin material is solid and engages the receiving plate and prevents rotation of the receiving plate;
    wherein the receiving plate has a receiving face to contact the ball, and the receiving face is planar and substantially orthogonal to the axis of the rotating shaft.

2. The device according to claim 1, wherein a wall of the holding recess has a circular cross section, and the receiving plate has a peripheral surface that conforms to the wall of the holding recess and a fitting face that faces the resin material, and the fitting face engages the resin material to prevent rotation of the receiving plate.

3. The device according to claim 2, wherein the fitting face includes a protrusion or a recess.

4. The device according to claim 3, wherein the protrusion or the recess is offset radially from the axis of the receiving plate.

5. The device according to claim 4, wherein the protrusion or the recess is formed at the radially outermost position of the receiving late.

6. The device according to claim 5, wherein the protrusion or the recess is a protrusion, and the protrusion has an outer face that is continuous with the peripheral face of the receiving plate.

7. The device according to claim 6, wherein a tip of the protrusion is chamfered.

8. The device according to claim 2, wherein the receiving face is opposite to the fitting face, and the fitting face includes a protrusion, and the receiving face has a recess aligned with the protrusion.

9. The device according to claim 2, wherein the receiving face is opposite to the fitting face and both the receiving face and the fitting face include recesses, and the configuration of the fitting face is the same as that of the receiving face.

10. The device according to claim 1, wherein the ball can move in a direction orthogonal to the axis of the rotating shaft.

11. The device according to claim 1, wherein the receiving plate has a receiving recess for admitting the ball.

12. The device according to claim 1, wherein the resin material changes to a solid state in the cavity to prevent the receiving plate from rotating.

13. A motor comprising:
    a drive shaft; and a speed reducing mechanism for slowing rotation of the drive shaft, wherein the speed reducing mechanism includes:
    a housing;
    a worm shaft located in the housing, wherein the worm shaft is connected to the drive shaft; and
    a thrust bearing device located near a distal end of the worm shaft, wherein the thrust bearing device includes:
        a housing in which a holding recess is formed;
        a receiving plate formed from metal and located in the holding recess to face the distal end of the worm shaft, wherein the receiving plate defines a resin cavity in the holding recess;
        a metallic ball located in the holding recess between the distal end of the worm shaft and the receiving plate, wherein the ball is located between the distal end face of the worm shaft and the receiving plate and makes point contact with the receiving plate; and
        a resin material that fills the resin cavity, wherein the resin material is solid and restricts axial movement of the worm shaft,
            wherein the receiving plate has a peripheral surface that conforms to and contacts a wall of the holding recess and a fitting face that faces the resin material, wherein the fitting face includes a protrusion, which is embedded in the resin material to prevent rotation of the receiving plate, wherein the protrusion has an outer face that contacts the wall of the holding recess.

14. The motor according to claim 13, wherein the protrusion is offset radially from the axis of the receiving plate.

15. The motor according to claim 14, wherein the protrusion is formed at the radially outermost position of the receiving plate.

16. The motor according to claim 15, wherein the outer face of the protrusion is continuous with the peripheral face of the receiving plate.

17. The motor according to claim 16, wherein a tip of the protrusion is chamfered.

18. The motor according to claim 13, wherein the ball can move in a direction orthogonal to the axis of the rotating shaft.

19. The motor according to claim 13, the receiving plate has a receiving face to contact the ball, and the receiving face is planar and substantially orthogonal to the axis of the rotating shaft.

20. The motor according to claim 13, wherein the receiving plate has a receiving recess for admitting the ball.

21. The motor according to claim 13, wherein the resin material changes to a solid state in the cavity to prevent the receiving plate from rotating.

* * * * *